US011849702B2

(12) United States Patent
Menzel

(10) Patent No.: US 11,849,702 B2
(45) Date of Patent: Dec. 26, 2023

(54) FEEDER SYSTEM FOR ANIMALS

(71) Applicant: Todd Menzel Commercial, LLC, Sun Prairie, WI (US)

(72) Inventor: Todd Menzel, Sun Prairie, WI (US)

(73) Assignee: Todd Menzel Commercial, LLC, Sun Prairie, WI (US)

( * ) Notice: Subject to any disclaimer, the term of this patent is extended or adjusted under 35 U.S.C. 154(b) by 428 days.

(21) Appl. No.: 17/214,303

(22) Filed: Mar. 26, 2021

(65) Prior Publication Data

US 2021/0298267 A1 Sep. 30, 2021

Related U.S. Application Data

(60) Provisional application No. 63/000,626, filed on Mar. 27, 2020.

(51) Int. Cl.
*A01K 1/10* (2006.01)
(52) U.S. Cl.
CPC ................... *A01K 1/105* (2013.01)
(58) Field of Classification Search
CPC ............ A01K 1/10; A01K 1/105; A01K 5/01
USPC .................................................. 119/58–60
See application file for complete search history.

(56) References Cited

U.S. PATENT DOCUMENTS

| | | | | |
|---|---|---|---|---|
| 2,830,558 A * | 4/1958 | St Pierre | ................... | A01K 5/01 119/58 |
| 4,930,449 A * | 6/1990 | Harton | ..................... | A01K 1/10 119/60 |
| 7,895,974 B2 * | 3/2011 | Brickell | ................... | A01K 5/01 119/61.2 |
| 8,763,555 B2 * | 7/2014 | Kurtz | ....................... | A01K 5/01 119/58 |
| 9,567,169 B2 * | 2/2017 | Camilletti | ................ | A01K 1/10 |
| 2007/0181069 A1 * | 8/2007 | Jack | ......................... | A01K 5/01 119/61.1 |

(Continued)

FOREIGN PATENT DOCUMENTS

| | | | | | |
|---|---|---|---|---|---|
| DE | 202016104907 U1 | * | 10/2016 | ............... | A01K 1/10 |
| GB | 2351001 A | * | 12/2000 | ............... | A01K 5/01 |
| KR | 101774704 B1 | * | 9/2017 | ............. | A01K 29/00 |

OTHER PUBLICATIONS

Hayhuts: Protecting Your Large Bale Investment; http://www.hayhuts.com/products.htm.

(Continued)

*Primary Examiner* — David J Parsley
*Assistant Examiner* — Danielle A Clerkley
(74) *Attorney, Agent, or Firm* — Boyle Fredrickson, S.C.

(57) ABSTRACT

Systems and methods for using a feeder system for animals are described. The modular system includes frame having a plurality of walls and a trolley system having a net system and shock system. The trolley system is movable relative to the plurality of walls in order to move the net system towards and away from a floor and a roof. More specifically, the trolley system allows the net system to be moved upwards towards the roof, after which food can be inserted into the frame. Once the food is appropriately located, the trolley system allows the net system to be moved downwardly until it is on top of the food to regulate the rate at which an animal consumes the food. The walls may have releasable fasteners that can be used to releasably secure the walls to one another, and the trolley system to one of the walls.

12 Claims, 19 Drawing Sheets

(56) References Cited

U.S. PATENT DOCUMENTS

2018/0343828 A1* 12/2018 Lunaas ................ A01K 5/0225

OTHER PUBLICATIONS

Image of Feeder System for Animals Posted on Midwest Horse Fair Facebook Page.

* cited by examiner

FEEDER SYSTEM FOR ANIMALS

CROSS-REFERENCE(S) TO RELATED APPLICATION(S)

This application claims the benefit of priority on U.S. Provisional Patent Application Ser. No. 63/000,626, filed on Mar. 27, 2020 and entitled Feeder System for Animals, the entirety of which is hereby incorporated by reference.

BACKGROUND OF THE INVENTION

1. Field of the Invention

The present invention relates in general to the field of feeder systems for animals. More particularly, the present invention relates to a feeder system that allows animals to more slowly consume a quantity of food product. Specifically, a preferred embodiment of the present invention relates to a feeder system that allows a user to quickly and easily prepare food for consumption by animals, while limiting the rate with which the animals can consume the food.

2. Discussion of the Related Art

Farm and other domesticated animals routinely graze throughout the day. Oftentimes, owners of animals regulate the quantity of food these animals consume on a daily basis by distributing bales of hay or other edible materials to various areas. These bales of hay or other edible materials are very heavy, and thus can be very difficult to move.

Although bales of hay and other consumable materials may be simply placed on the ground where the animals live, this can be undesirable for a number of reasons. First off, the food can be exposed to various elements, including rain, sleet, snow, and the like. Exposing this food to moisture can cause the animal to be less inclined to consume the food. Additionally, when the food is simply placed on the ground, the animals are free to eat as much as they want as quickly as they want. This can result in stomach issues, digestive issues, unwanted weight gain, and other health issues.

As a result, many owners use different feeder systems to improve the feeding of their animals. Traditional feeders may include a base surface on which food may be rested and optional side surfaces. Such feeders are exposed to the elements. When moisture enters the feeder, it can collect along the floor, bottom, and sides. This can cause the food supply to soak in water in an undesired way. Where water and other moisture pool about the feeder, the food contained thereon can become moldy and thus undesirable to the animals.

Other feeders can simply consist of a roof surface to provide coverage to the food. However, having roof surfaces can result in rain, snow, and other moisture falling off of the roof haphazardly and onto the animals. When this occurs, the animals may be startled, and thereafter run away from the feeder. Other times, when moisture falls onto an animal, the animal may buck up, which can result in injuries due to contact with the roof Sometimes, this causes the animals to be hesitant to consume future meals from the feeder.

Furthermore, traditional feeders do not limit the rate of consumption of the food by the animals. While some ways have been introduced that help to slow down the rate of consumption, they are typically difficult and time consuming to apply. For instance, bales of food may be surrounded by materials, such as nets, that prevent the animal from consuming at an unlimited rate. However, as mentioned above, bales of food such as hay are very heavy, which in turn makes it difficult and time consuming to install the nets or other materials around the bale.

Also, because traditional feeder systems need to be durable, they are often made of steel and other materials with sharp edges that can injure an animal. Further still, pre-assembled feeders are typically large and expensive to ship.

What is needed therefore is a feeder system that addresses any of the above issues. More specifically, what is needed is a feeder system that limits the rate at which an animal is able to eat food contained therein. What is further needed is a feeder system that allows a user to quickly and easily deliver food to the feeder system, after which it can be consumed by an animal at a desired consumption rate. What is further needed is a feeder system that prevents accumulation of moisture relative to the food supply, and also prevents inadvertent dripping of water onto animals that may startle or upset the animals. What is also needed is a feeder system that has minimal sharp or rough surfaces that can cause injury to an animal What is further still needed is a feeder system that enables quick and easy installation of a net or restraint system or other device about the bale of food product in order to reduce the rate with which animals can consume the food product. What is further needed is a modular feeder system where various components may be shipped separately and assembled at a later time for cheaper delivery and assembly.

SUMMARY AND OBJECTS OF THE INVENTION

By way of summary, the present invention is directed to a feeder system for supplying food to at least one animal comprising a frame and a trolley system releasably fastened to the frame. More specifically, the frame may include at least one wall and a floor. For instance, the at least one floor may include a first wall having a base, a second wall having a base, a third wall having a base and at least one releasable fastener configured to releasably fasten to the first wall, and a convexly sloped floor located within the first wall, the second wall, and the third wall. The frame may also include a fourth wall having a base. Additionally, the trolley system may be located within the frame. The trolley system may be releasably fastened to the third wall, which may include a net system located within the walls and a shock system attached to the net system. The shock system may be configured to enable upward and downward movement of the net system. The trolley system may be moved between a lowered position where the net system is located adjacent to the floor to a raised position where the shock system moves the net system upwardly and a quantity of food product is inserted into the frame, to a lowered position where the net system rests on top of the quantity of food. As a result, the trolley system may enable expedited installation of the quantity of food. At least one opening may be formed between at least one of the walls and the floor, and the floor may be sloped substantially evenly toward the opening.

According to another aspect of the present invention, the walls may further comprise a plurality of spaced uprights. These spaced uprights may be oriented relative to the bases at a variety of angles, for instance, at an angle of between 25-75 degrees relative to the base, at an angle of between 35-55 degrees relative to the base, and substantially vertical relative to the base. Each of these plurality of spaced uprights may be releasably installable on the bases of the walls. This allows the spaced uprights to be an optional feature that can later be installed, and also simplifies shipping and assembly of the feeder system.

According to another aspect of the present invention, the at least one releasable fastener of the third wall may further comprise a first releasable fastener, as second releasable fastener, and a third releasable fastener. The first releasable fastener may be located where the third wall meets the first wall at a top of the plurality of spaced uprights. The second releasable fastener may be located where the third wall meets the first wall at a bottom of the plurality of spaced uprights. The third releasable fastener may be located substantially midway along the third wall at the bottom of the plurality of spaced fasteners. The first and second releasable fasteners may be removed to allow the third wall to pivot relative to the first wall up to 180 degrees. Additionally, the third releasable fastener may be removed to allow the trolley system to move from the lowered position to the raised position. Further still, the third releasable fastener may be configured to hold the trolley in place relative to the frame. The first, second, and third releasable fasteners may be pins.

According to yet another aspect of the invention, the frame may further comprise a roof that extends upwardly from the first, second, third, and fourth walls. The roof may be removably attachable to the walls. Again, this allows the feeder to not require a roof, and where a roof is desired, it can be shipped disassembled. Further, at least one outlet may be formed in a corner of the roof. Additionally, the roof may be sloped towards the at least one outlet to help encourage drainage from the roof through the at least one outlet.

According to yet another aspect of the invention, the first wall, second wall, third wall, and fourth wall may form one of a seven-foot-by-seven-foot frame; a six-foot-by-six-foot frame; a five-foot-by-five-foot frame; a five-foot-by-ten-foot frame; and a four-foot-by-five-foot frame. Additionally, the net system may be selected from one of a eleven-foot-by-eleven-foot net; a ten-foot-by-ten-foot net; a nine-foot-by-nine-foot net; a nine-foot-by-fourteen-foot net; and an eight-foot-by-nine-foot net.

According to another aspect of the invention, the feeder may be substantially circular in shape. Such a feeder could have a single, continuous wall. Of course, the net system would have a similar diameter as the single, continuous wall of the circular feeder frame. specific size and shape of the feeder could be determined based on the size and shape of the bale of hay.

According to another aspect of the invention, the feeder frame may further comprise a rail system that is located within the frame. The rail system is configured to receive at least a portion of the net system. The shock system is located between the at least one of the walls and the rail system to prevent access by the at least one animal Additionally, a plurality of openings may be located adjacent to the rail system. A plurality of hooks may be used with the opening s that wrap around the rail system to secure the net system in place. Further still, a plurality of screws and bolts may secure the shock system to the frame. The plurality of screws and bolts may be mounted within the frame to prevent access by the at least one animal. Also, the feeder system may include at least one bump stop with a first bump stop component and a second bump stop component. The first bump stop component may extend from the frame. The second bump stop component may extend from the shock system to prevent further movement the shock system relative to the frame.

According to another aspect of the invention, a modular feeder system for supplying food to at least one animal includes a base pan, a plurality of walls extending from the base pan, and a trolley system. At least one of the plurality of walls are releasably fastened to another. The trolley system includes a net system and is movable in an upward direction where food is inserted into the plurality of walls, and then in a downward direction where the net system rests upon the food. Additionally, multiple base pans may be stacked atop one another for transportation. The system also may include first and second fasteners, where the first fastener is configured to releasably hold at least one of the plurality of walls to another, and the second fastener is configured to releasably hold the trolley system in place relative to the plurality of walls. Further, a plurality of spaced uprights may be releasably associated with the plurality of walls. Also, a roof may be releasably associated with the plurality of walls. Further still, the system may include a first leg and a second leg extending downwardly from the base pan, a first cross bar extending from the first leg to the second leg substantially parallel to the base pan. Additionally, a third leg and a fourth leg may extend downwardly from the base pan, with a second cross bar extending from the third leg to the fourth leg substantially parallel to the base pan. The first cross bar and the second cross bar may be laterally offset from one another such that the feeder system can be moved by equipment engaging the first and second cross bars.

According to another aspect of the invention, a method of using a modular feeder system to quickly insert a quantity of food into the feed system is provided. This can include removing a first releasable fastener from a first wall that secures the first wall to a second wall, removing a second fastener from the first wall that secures the first wall to a trolley system with a net system and a suspension system, pivoting the first wall away from the second wall, lifting the trolley system upwardly, inserting a quantity of food beneath the trolley system, lowering the trolley system downwardly so the net system is located on top of the food, pivoting the first wall towards the second wall, and replacing the first releasable fastener and the second releasable fastener. The method may also include the steps of draining a quantity of water from a roof to an opening formed in a corner of the roof and draining a quantity of water from an interior of the feeder system through an opening formed between the first wall and a convex sloped floor. Additionally, the method may include the step of removably installing the roof onto the first wall and the second wall. Further, the plurality of spaced uprights may be removably installed onto the first wall and the second wall. Further still, a first cross bar and a second cross bar that extend from the convex slope floor may be engaged to move the feeder system from a first location to a second location.

These and other aspects and objects of the present invention will be better appreciated and understood when considered in conjunction with the following description and the accompanying drawings. It should be understood, however, that the following description, while indicating preferred embodiments of the present invention, is given by way of illustration and not of limitation. Many changes and modifications may be made within the scope of the present invention without departing from the spirit thereof, and the invention includes all such modifications.

BRIEF DESCRIPTION OF THE DRAWINGS

A clear conception of the advantages and features constituting the present invention, and of the construction and operation of typical mechanisms provided with the present invention, will become more readily apparent by referring to the exemplary, and therefore non-limiting, embodiments illustrated in the drawings accompanying and forming a part of this specification, wherein like reference numerals designate the same elements in the several views, and in which.

Figure 1:
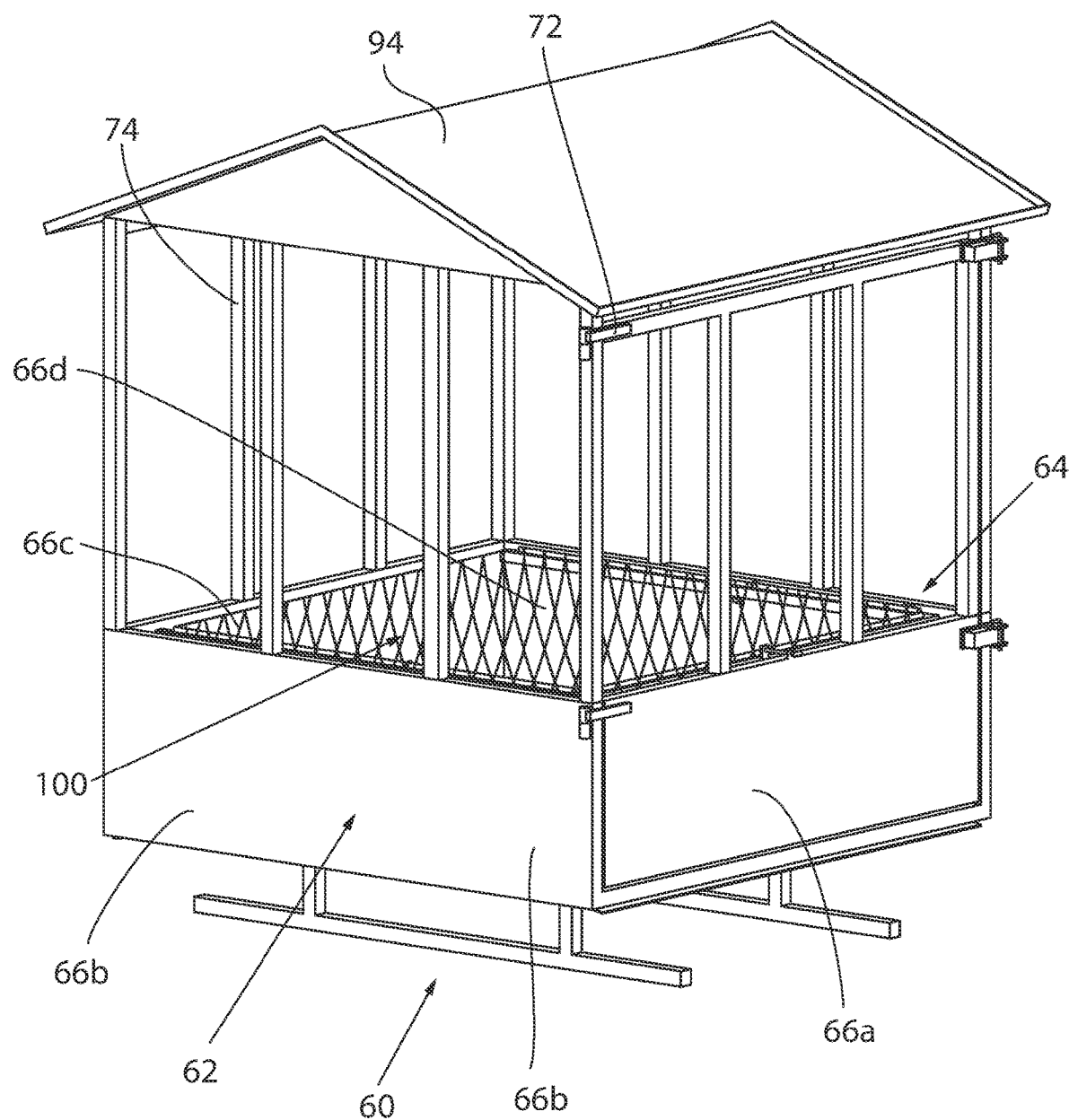
FIG. 1 illustrates an isometric perspective view of an inventive feeder system for animals.

In describing the preferred embodiment of the invention which is illustrated in the drawings, specific terminology will be resorted to for the sake of clarity. However, it is not intended that the invention be limited to the specific terms so selected and it is to be understood that each specific term includes all technical equivalents which operate in a similar manner to accomplish a similar purpose. For example, the word connected, attached, or terms similar thereto are often used. They are not limited to direct connection but include connection through other elements where such connection is recognized as being equivalent by those skilled in the art.

DESCRIPTION OF PREFERRED EMBODIMENTS

The present invention and the various features and advantageous details thereof are explained more fully with reference to the non-limiting embodiments described in detail in the following description.

1. System Overview

The present invention relates to a specialized, modular feeder system for animals with slow release features to ensure animals do not ingest food contained therein too quickly. More specifically, the present invention is a specialized hay feeder with a slow release hay system. The system keeps the hay dry and contained for animal consumption, while keeping the animals safe. The system is configured to help keep hay inside the feeder and moisture and water outside of the feeder. The system includes a trolley and net system that can easily and quickly be moved between a lowered position and an upward position to simplify delivery of the food product into the feeder. Ideally, the feeder helps to reduce wasted hay while also improving the health and safety of the animals using it.

In operation, the feeder has walls that are easily and quickly connected to one another, with at least one wall that is movable relative to the others when releasable fasteners such as pins are removed. Namely, two pins may be removed from the first wall to release it from the others, after which it can rotate to open. A third pin may be removed to allow the trolley system to move relative to the frame. Once the trolley system is moved to a raised position, the food may be delivered to the interior of the feeder. After that, the wall may be closed and the pins may be reinserted. Additionally, the trolley system may be returned to the lowered position, after which it can be secured in place using another pin. As a result, the product may be delivered and netted very quickly, for instance, in less than one minute.

The feeder system may include additional features, such as a shock system that is tucked between a rail system and a side of the feeder, which helps to reduce pinch points. Additionally, there may be screws and bolts that are tucked away beneath the shock system and rail system to help prevent animals from getting hurt by the components. Furthermore, the feeder may feature bump stops to prevent the trolley system from moving past a desired location. Also, hooks may be used to help secure the net system relative to the rail system. Additionally, the feeder system may include a roof that may be made of a single piece of material that is bent at the top, or multiple pieces that are overlapped, sealed, caulked, and tapped. The roof may be sheered on ends and overlapped on top and tacked through. Also, the roof may have snipped corners that allow for drainage of water from the roof down to the ground. Also, the feeder may have hinge designs that are countersunk hinges with bearings where the hinges are longer, wider, and thicker to reduce the risk of breakage. Additionally, the floor may have a spaced opened and rounded edges to prevent animals from being cut on the floor. The floor may also be convex, which allows water that gets into the inside of the feeder to flow out of the edge of the floor.

2. Detailed Description of Preferred Embodiments

Figure 16:
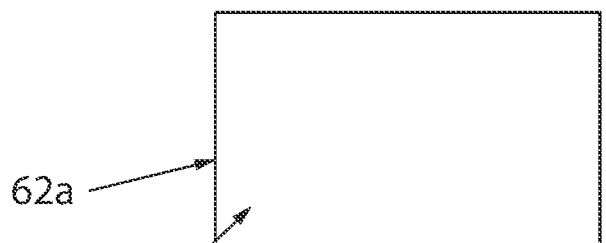
FIG. 16 illustrates top plan views of various shapes of the inventive feeders.
Figure 16:
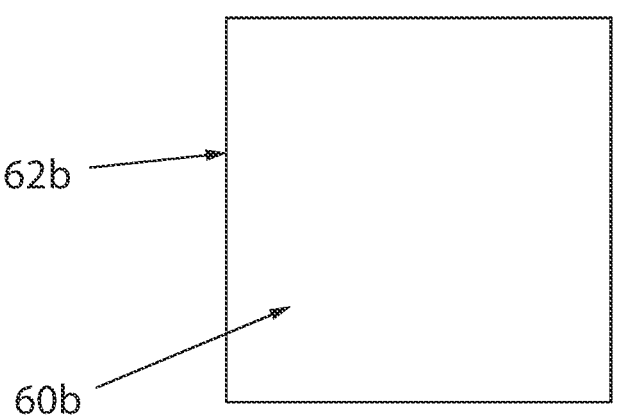
Figure 16:
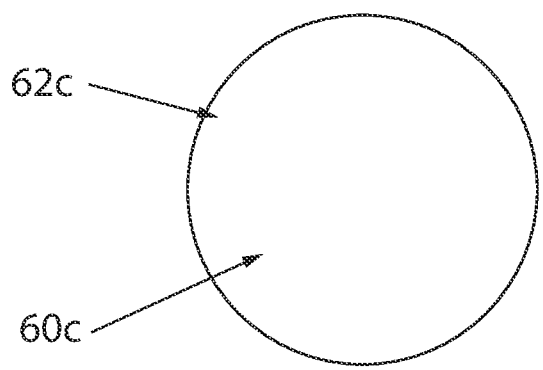
Figure 17:
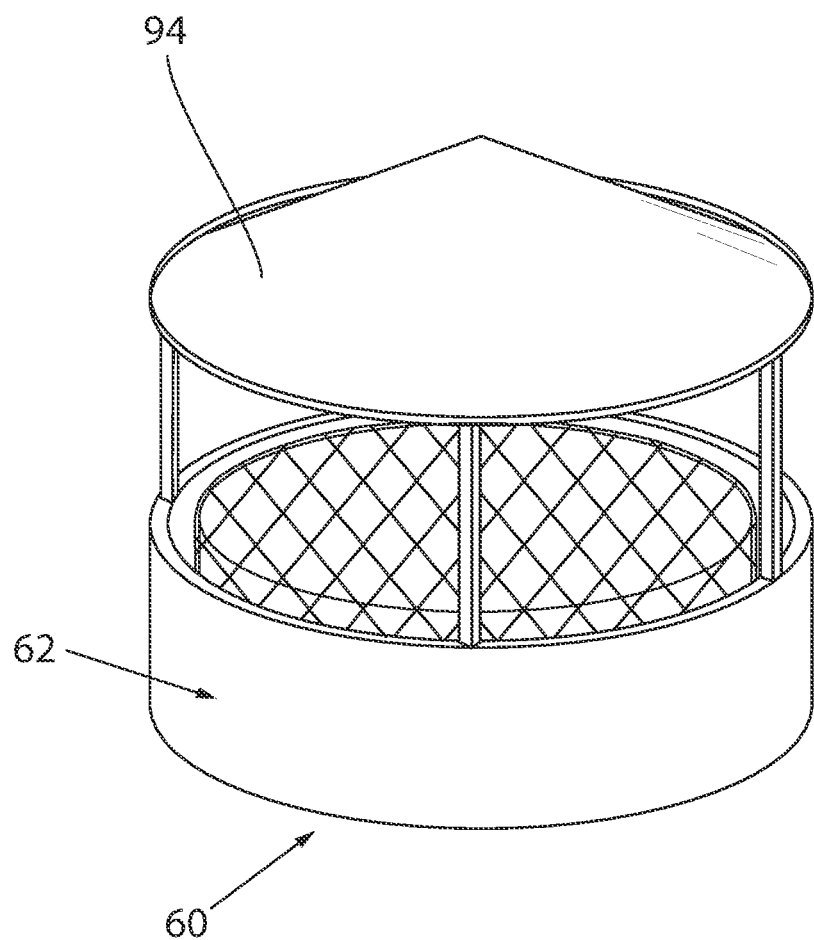
FIG. 17 illustrates an isometric perspective view of an inventor feeder system for animals.

Turning to the figures, a feeder system 60 for supplying food to at least one animal is provided that includes a frame 62 and a trolley system 64. The frame 62 is made of steel or other durable materials equipped to withstand rain, snow, and other weather elements, as well as interactions with various farm animals. The frame 62 may have a number of sides, walls, or side walls. For instance, as shown some of the frames 62 have four side walls 66a, 66b, 66c, 66d to create a square or rectangle-shaped frame 62. The frame 62 may have additional or fewer number of sides depending on the desired size and shape of the feeder system 60. Other frames 62, such as what is shown in FIG. 17 have single continuous wall 66 creating a circular or substantially circular shaped frame 62. Additionally, the length of the walls 66 can vary depending on desired size of the frame 62. For instance, potential sizes of frames 62 may include a seven-foot-by-seven-foot frame, a six-foot-by-six-foot frame, a five-foot-by-five-foot frame, a five-foot-by-ten-foot frame, and a four-foot-by-five-foot frame. Of course, these dimensions are exemplary in nature, and the frames could be larger or smaller depending on the needs of a user, the size of the animals, and the size and shape of the food product 68 used with a given feeder system 60. For instance, FIG. 16 shows top plan views of different feeder systems 60a, 60b, 60c having frames 62a, 62b, 62c in different shapes and sizes. Potential food products 68 may include round bales, square bales, rectangular bales, and the like.

Figure 3:
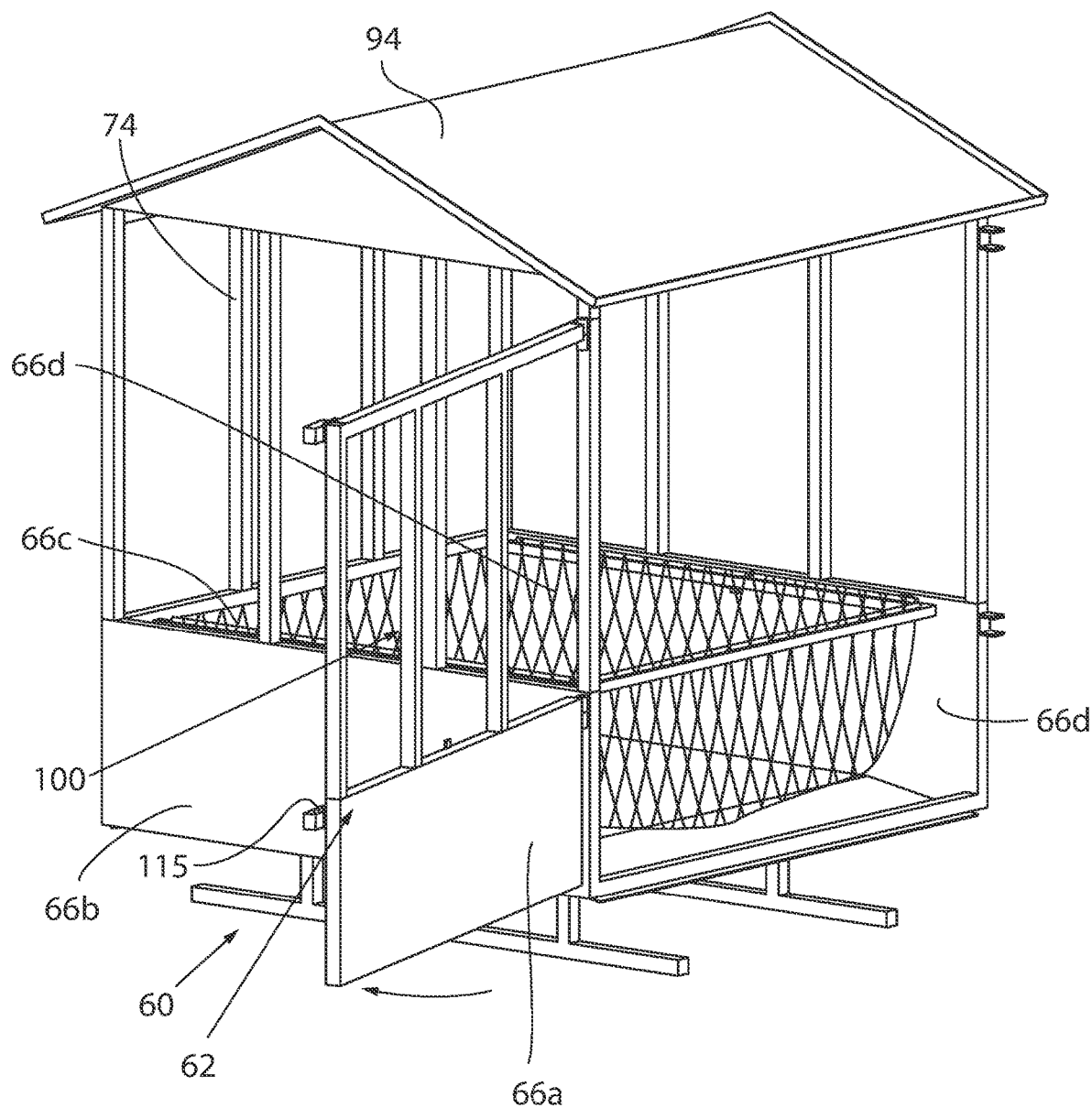
FIG. 3 illustrates an isometric perspective view of the inventive feeder of FIGS. 1 and 2 where the first wall is pivoted about the frame to an opened position.
Figure 4:
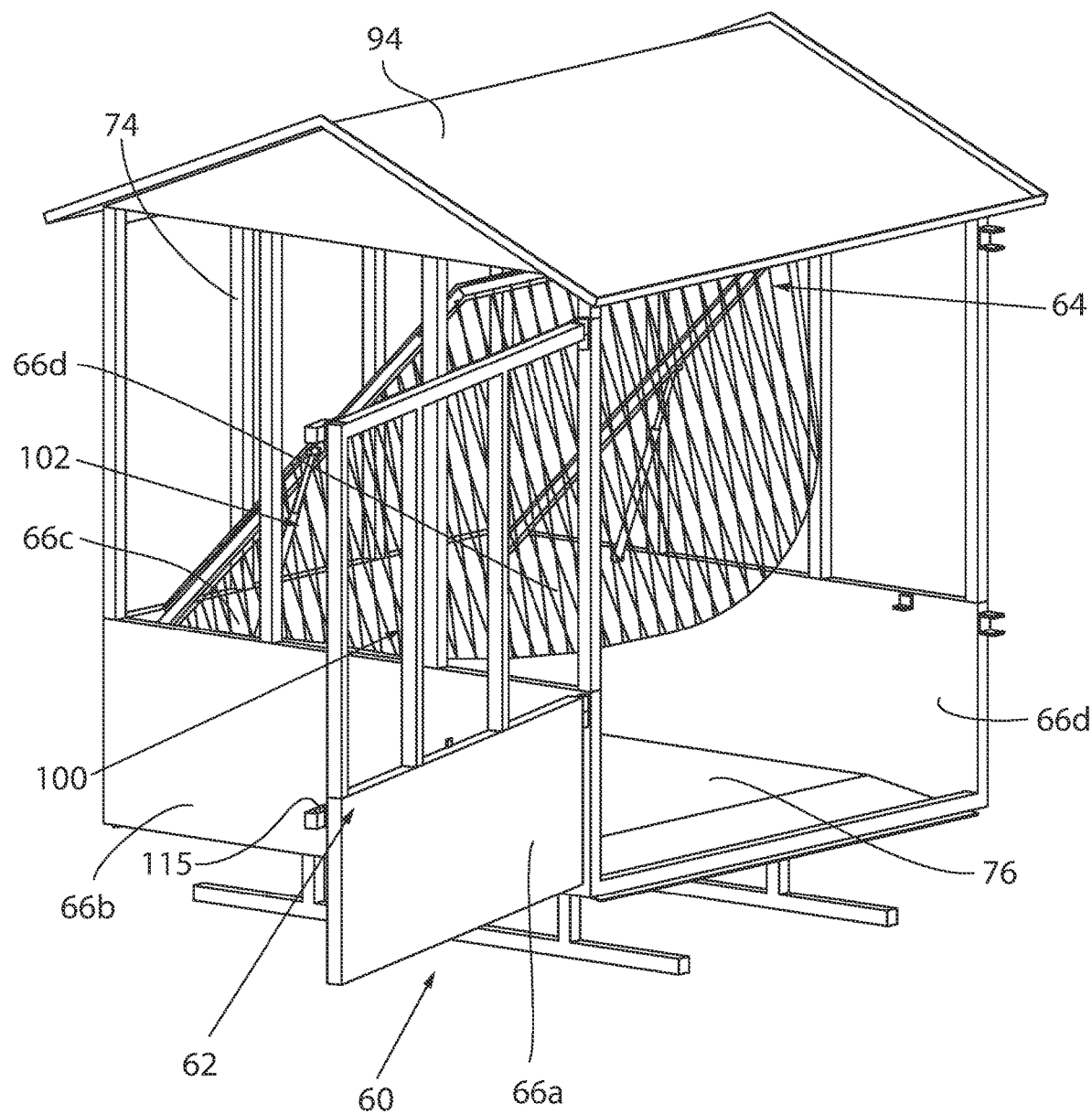
FIG. 4 illustrates an isometric perspective view of the inventive feeder of FIGS. 1-3 where a trolley system is moved upwardly.
Figure 5:
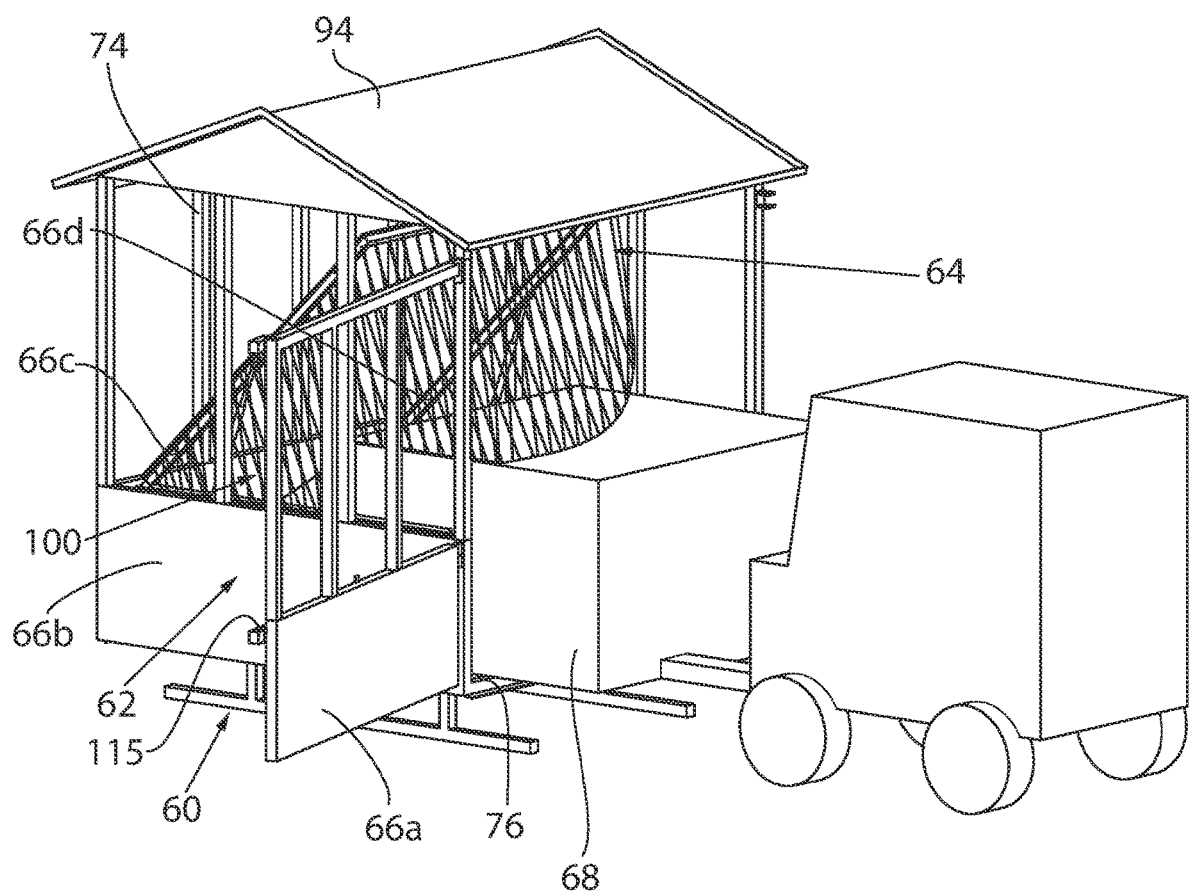
FIG. 5 illustrates an isometric perspective view of the inventive feeder of FIGS. 1-4 where food is deposited within the frame.
Figure 6:
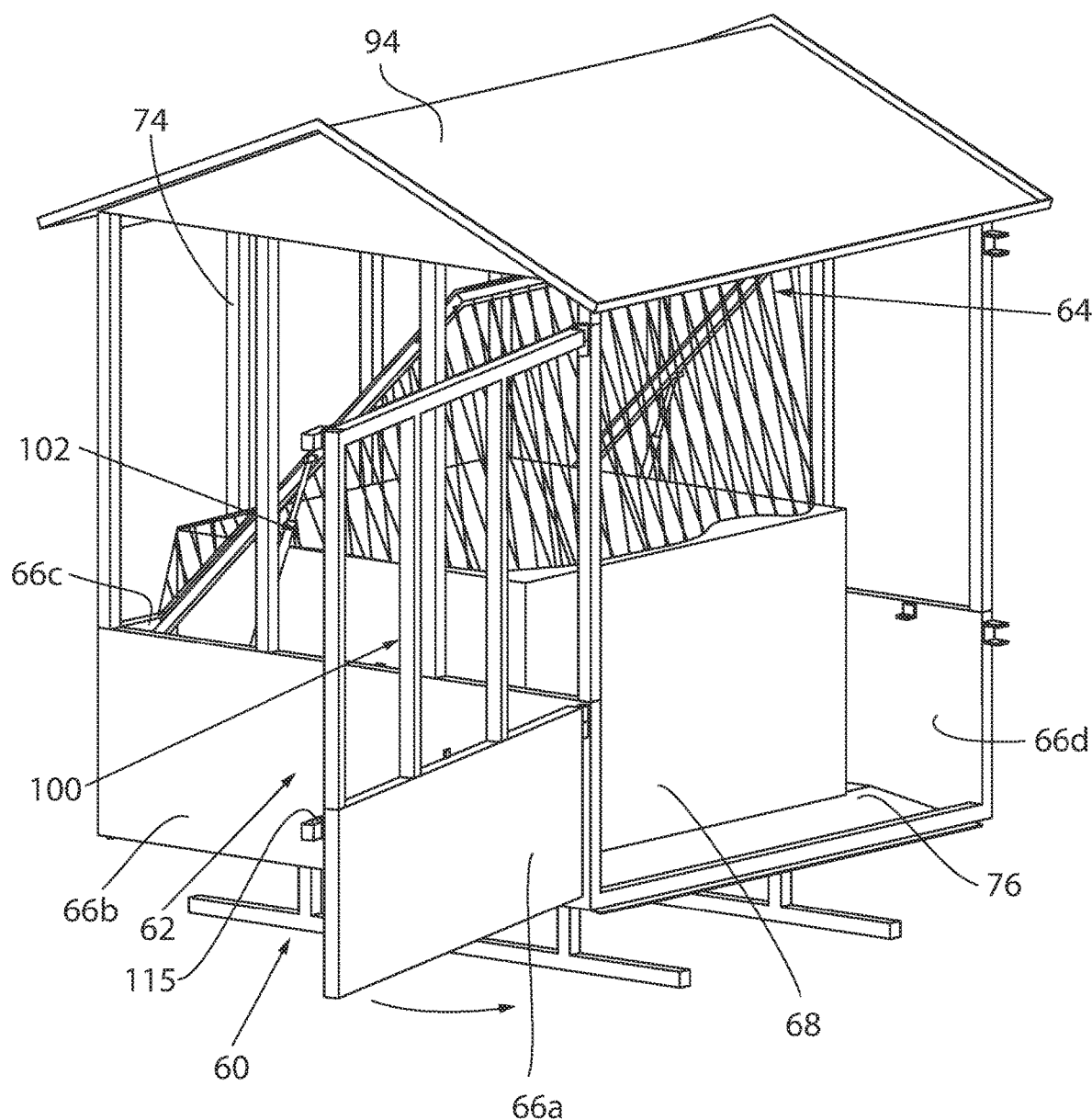
FIG. 6 illustrates an isometric perspective view of the inventive feeder of FIGS. 1-5 where the first wall is pivoted about the frame to a closed position.

At least one of the sides 66a is rotatably movable relative to the other sides 66b, 66c, 66d, otherwise an optional door (not shown) may be moved relative to one or more of the sides 66. For instance, the first side 66a may be pivotably connected to the second side 66b, and releasably connected to the fourth side 66d. Thus, once the connection between the first side 66a and the fourth side 66b is terminated, the first side 66a may pivot and rotate relative to the second side 66b. More specifically, the first side 66a may be rotated approximately 180 degrees relative to the second side 66b as seen in FIGS. 3-6. As a result of this rotation, the interior of the frame 62 can be exposed, such that food product 68 can be inserted therein, as seen in FIG. 5. Once the food product 68 has been delivered, the first side 66a can be rotated back towards the fourth side 66b as shown in FIG. 6, and the first side 66a can again be secured to the fourth side 66b. Additionally, the joint where the first side 66a meets the second side 66b may have a reinforced hinge design 72 as seen in FIG. 1 that helps improve the durability of the feeder system 60 despite repeated opening and closing of the first side 66a.

Figure 8:
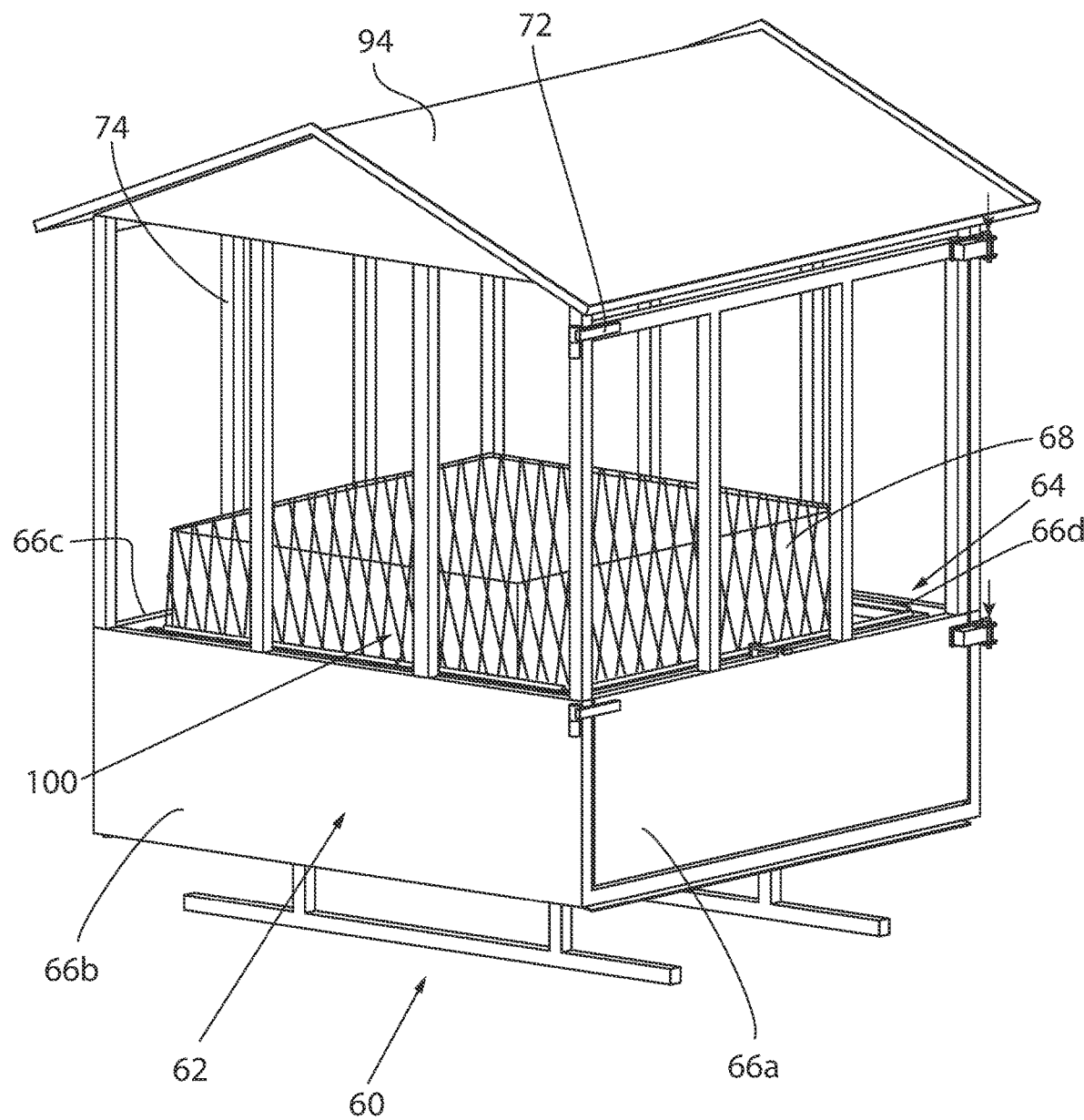
FIG. 8 illustrates an isometric perspective view of the inventive feeder of FIGS. 1-7 where the feeder is ready for consumption of food by an animal.
Figure 9:
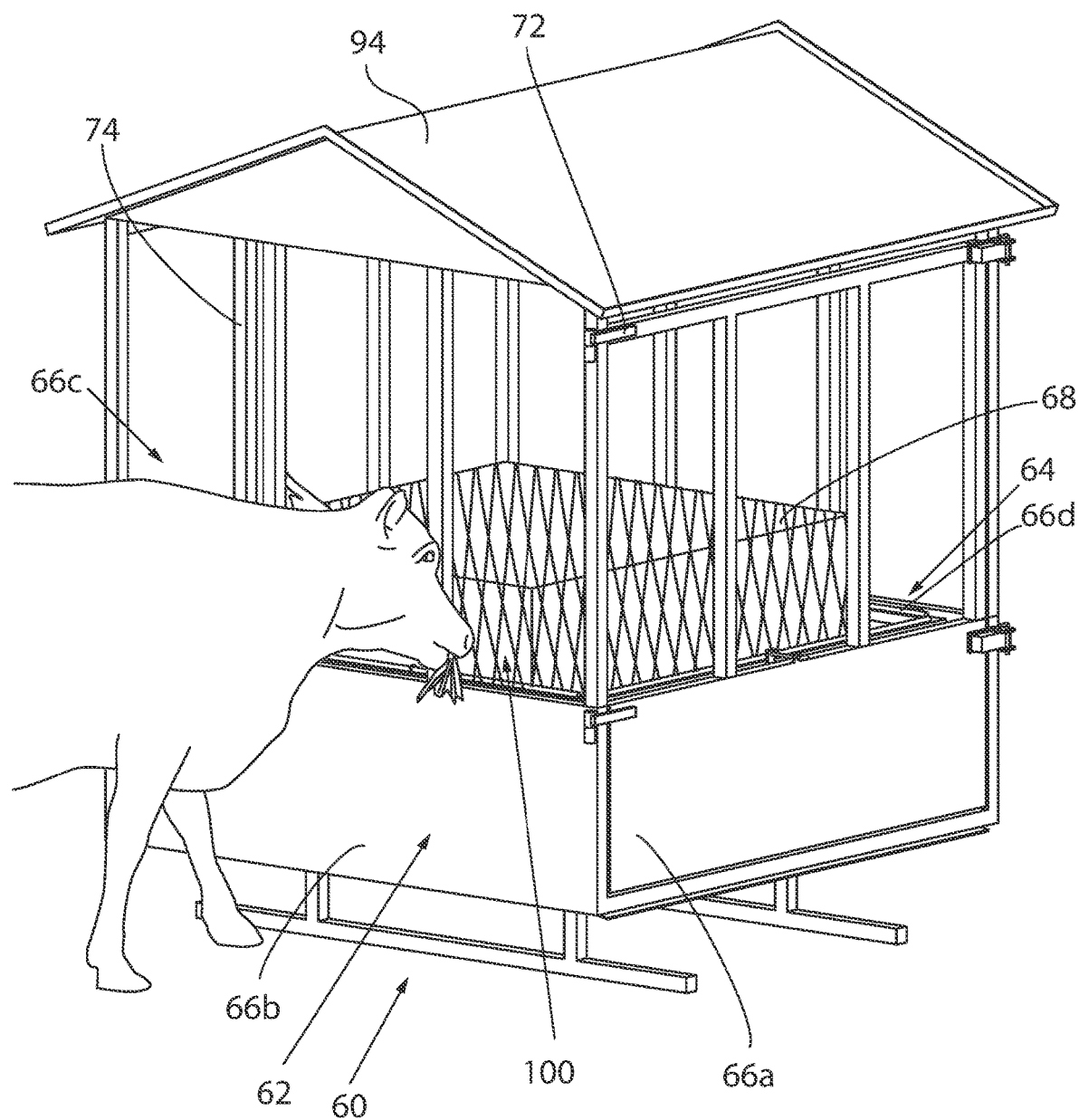
FIG. 9 illustrates another isometric perspective view of the inventive feeder of FIGS. 1-8 where the feeder is ready for consumption of food by an animal.
Figure 10:
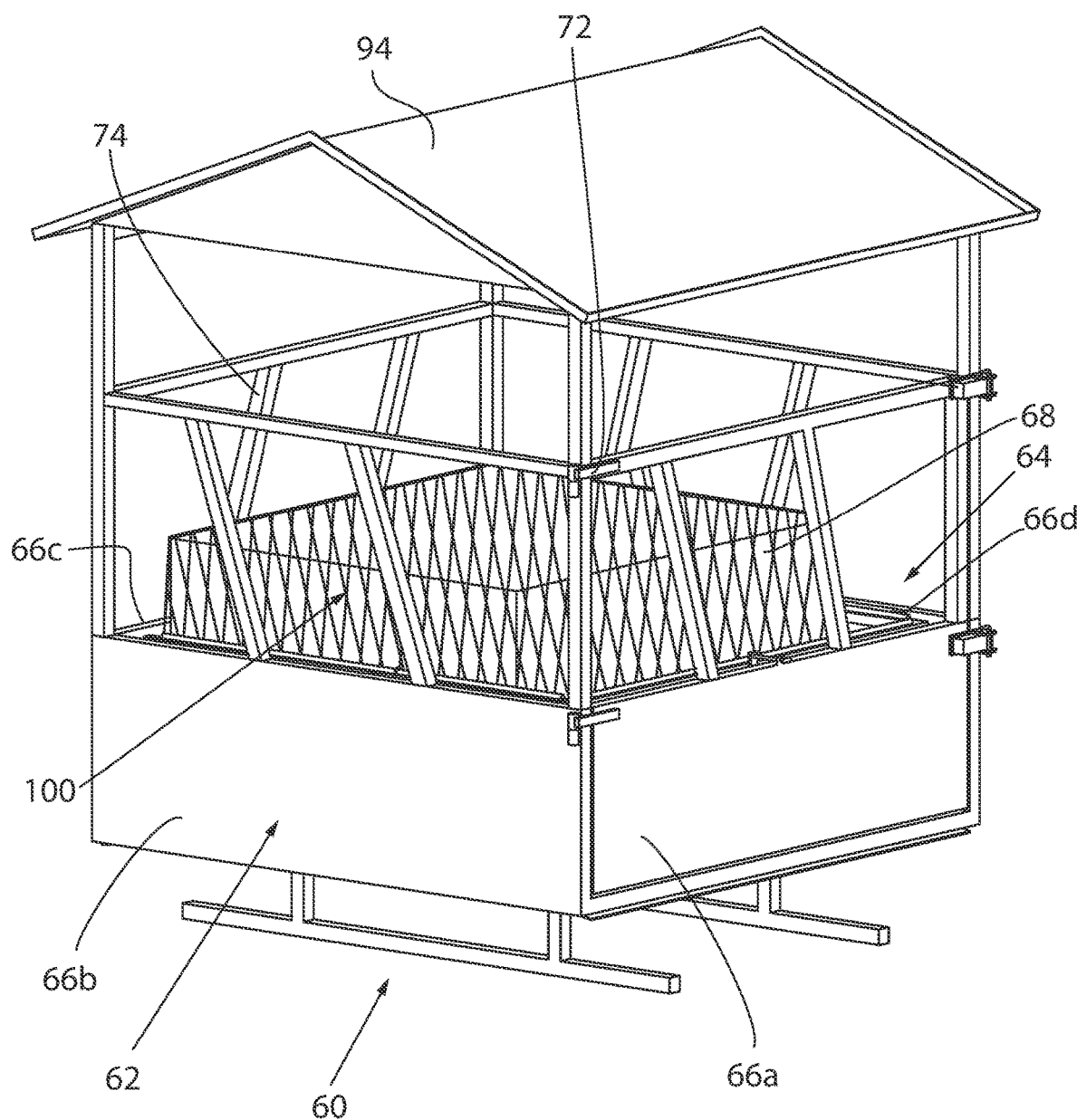
FIG. 10 illustrates an isometric perspective view of an inventive feeder system for animals.
Figure 13:
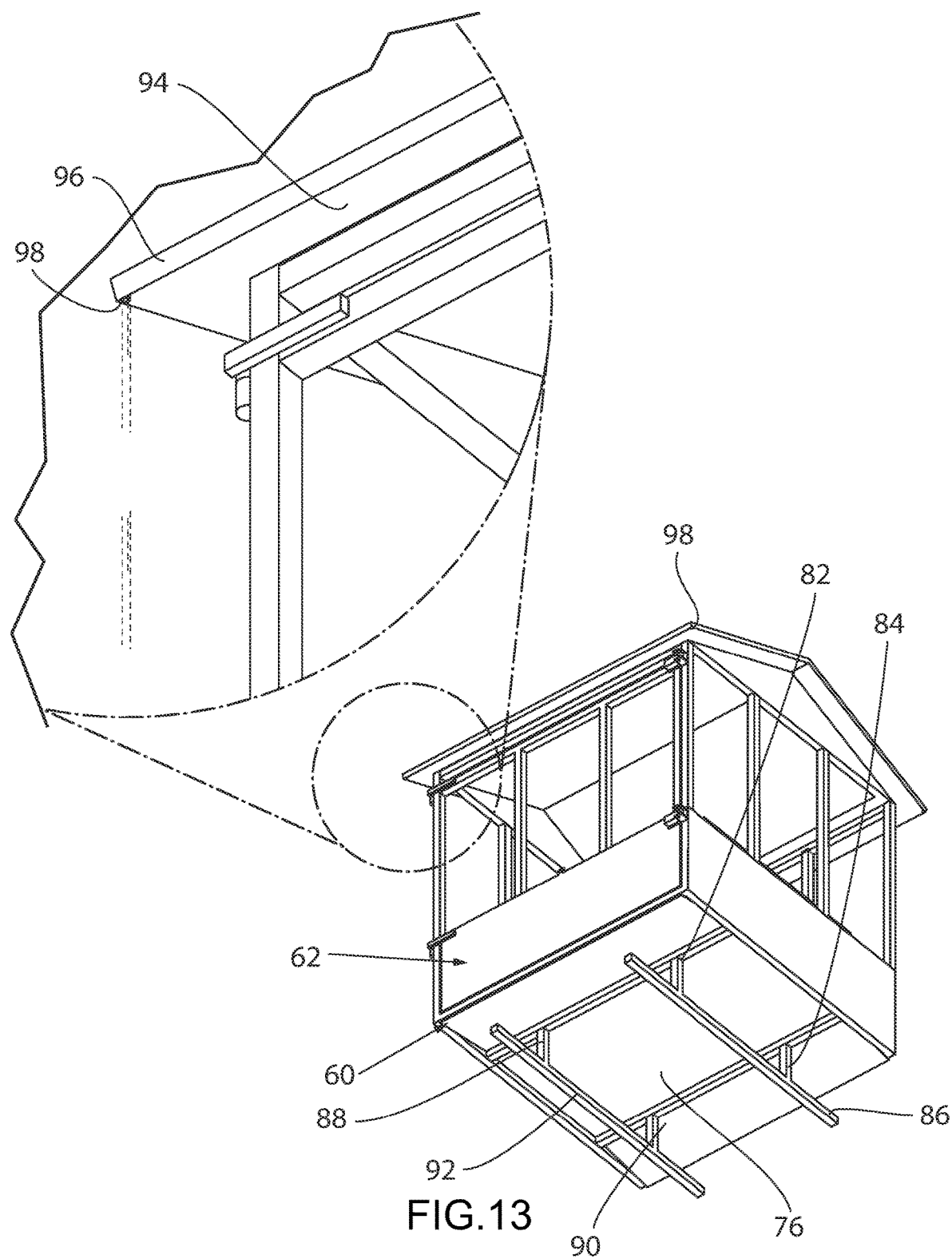
FIG. 13 illustrates an isometric bottom perspective view of an inventive feeder system for animals and a detailed view of the frame and roof.
Figure 14:
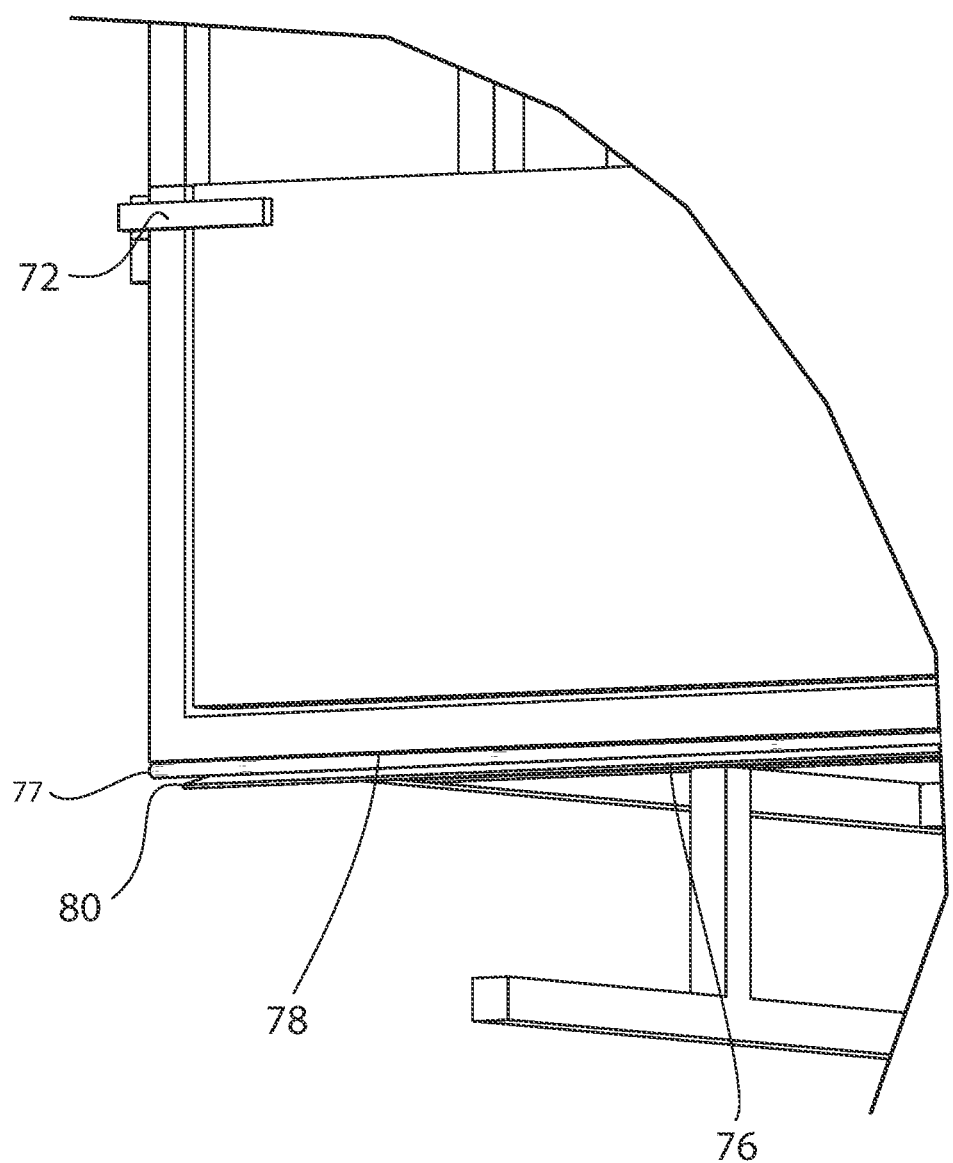
FIG. 14 illustrates an isometric bottom perspective view of the frame and floor.

Each of these sides 66 may include a base 70 that extend along the bottom of each side 66. Additionally, the sides 66 may have a plurality of spaced uprights 74 that extend upwardly from the base 70. The plurality of spaced uprights 74 allow multiple animals to eat peacefully at the same time. More specifically, the spaced uprights 74 help to allow movement of the animals, but restrict side-to-side motion. Minimizing the side-to-side motion may be preferred because it helps to minimize attacks on other animals by "in-charge" animals. Without the uprights 74, there is the possibility that "in-charge" animals would nip or bite at other animals in an attempt to run them off away from the food. The plurality of spaced uprights 74 may be manufactured with the base 70, or they can be removably connected to the base 70. Where the plurality of spaced uprights 74 is removably connected to the base 70, this allows the feeder 60 to optionally feature the spaced uprights 74. This can also help to simplify and streamline the shipping process of the sides 66 of the feeder 60. The plurality of spaced uprights 74 may be oriented at a number of different angles. For instance, the plurality of spaced uprights may extend substantially vertically as shown in FIGS. 1-9. The uprights 74 may also be oriented at an angle as seen in FIG. 10. For instance, the uprights 74 may extend at an angle of between 25-75 degrees relative to the base 70, as seen. Furthermore, the plurality of spaced uprights may extend at an angle of between 35-55 degrees relative to the base 70. Additionally, a drain hole may be formed in the bottom of each upright 74. More specifically, a drain hole may be formed to allow condensation that can build up within the upright 74 to drain downwardly and out of the upright 74. This helps to prevent accumulation of water within the upright 74 and potential freezing of that water in cold temperatures. It also helps to prevent rusting from occurring due to the accumulation of water. Each upright 74 may be sealed with a weld with a pre-stamped hole to enable this drainage of accumulation out of the upright 74. Also, the frame may include a floor or base pan 76. More specifically, as shown, the frame 62 includes a convexly sloped floor 76 that helps to encourage liquids that enter the feeder system 60 to flow out of the feeder system 60. For instance, the floor 76 may be sloped towards the first side wall 66a and the third side wall 66c such that water contained within the feeder system 60 may drain towards the first wall 66a and the third wall 66c. Additionally, the floor 76 may slope towards the second wall 66b and the fourth wall 66d. As such, the floor 76 may be separated from the base 70 to create a drain opening 78 that extends along the length of the floor 76 as shown in FIGS. 13 and 14. Additionally, the edges or corners 80 of the floor may be grinded and smoothed to minimize potential risk of injury to that animals that contact the floor 76.

Additional components may be mounted to the floor 76. For instance, the floor 76 may include a round bar 77 that extends along a length of a portion or all of the floor 76. This round bay 77 provides reinforcement to the floor 76, and allows the feeder system 60 to be lifted and moved without damaging or bending the floor 76, for instance when a forklift is used to move the system 60. Additionally, the round bar 77 is welded to be flush with the floor 76 so as to prevent any surfaces that could cause injury to an animal.

Additionally, as shown in FIG. 13, the feeder system 60 includes a first leg 82 and a second leg 84 extending downwardly from the base pan/floor 76 and a first cross bar 86 extending between the first leg 82 and the second leg 84. Additionally, the feeder system 60 may include a third leg 88 and a fourth leg 90 extending downwardly from the base pan/floor 76, with a second cross bar 92 extending therebetween. The first and second cross bars 86, 92 may be laterally offset from one another. When the system 60 is moved from location to location, equipment may engage with the cross bars 86, 92 in order to move the feeder system 60.

Further still, the frame 62 may include a roof 94. The roof 94 may extend upwardly from the sides 66. The roof 94 may be removably attachable to the sides 66, which can help simplify shipping of the feeder system 60 prior to assembly. As shown, the roof 94 is sloped to encourage drainage of rain, snow, and any other precipitation from the roof in a downward direction away from the food and animals. The roof 94 may have a lip 96 that extends around the exterior and a plurality of outlet openings 98 formed therein to control the drainage of the precipitation. For instance, as shown in FIG. 13, openings 98 are formed in the corners of the roof 94. By having the lip 96 and the openings 98, spillage of precipitation off of the roof 94 can be controlled, which in turn can help minimize startling of the animal if precipitation could flow off any side portion of the roof 94. Without this controlled flow of water, water may drip off the roof onto animals, which may startle them, causing them to rear up and injure themselves.

Next, the trolley system 64 will be described. The trolley system 64 may be releasably fastened to at least one of the side walls 66. Additionally, the trolley system 64 may be movable or pivotable relative to the frame 62. More specifically, the trolley system 64 may be movable or pivotable in an upward and downward direction relative to the frame 62. The trolley system 64 may include a food restraint or net system 100 that is located within the walls 66, and a suspension/shock system 102 that the restraint or net system 100 is attached to. For instance, the shock system 102 may by powered by gas air shocks. The net system 100 is configured to surround the food product 68 in order to reduce the rate of consumption by the animal. The net system 100 is dimensioned to remain within the frame 62 because there is risk of injury to the animal if the net system 100 extended outside of the frame 62. More specifically, animals can step in or otherwise get caught in a net if it extends beyond the frame. For instance, the net system 100 may be dimensioned to be four feet longer in each direction than the dimensions of the frame 62. These dimensions can help allow a full bale of hay or other food to be properly covered while also allowing the net to fall freely to the bottom to ensure all food product is consumed. The net system 100 could similarly be longer or shorter as desired. The floor 76 of the feeder 60 allows the net to freefall along the sides vertically so that the netting system 100 is not bunched up or in the way of feeding. For instance, an eleven-foot-by-eleven-foot net may be used with the seven-foot-by-seven-foot frame; a ten-foot-by-ten-foot net may be used with the six-foot-by-six-foot frame; a nine-foot-by-nine-foot net may be used with the five-foot-by-five-foot frame; a nine-foot-by-fourteen-foot net may be used with the five-foot-by-ten-foot frame; and an eight-foot-by-nine-foot net may be used with the four-foot-by-five-foot frame. The net system 100 may have a number of different configurations to slow down or speed up consumption of food by animals, including ¾-inch squares up to 4-inch squares.

Figure 7:
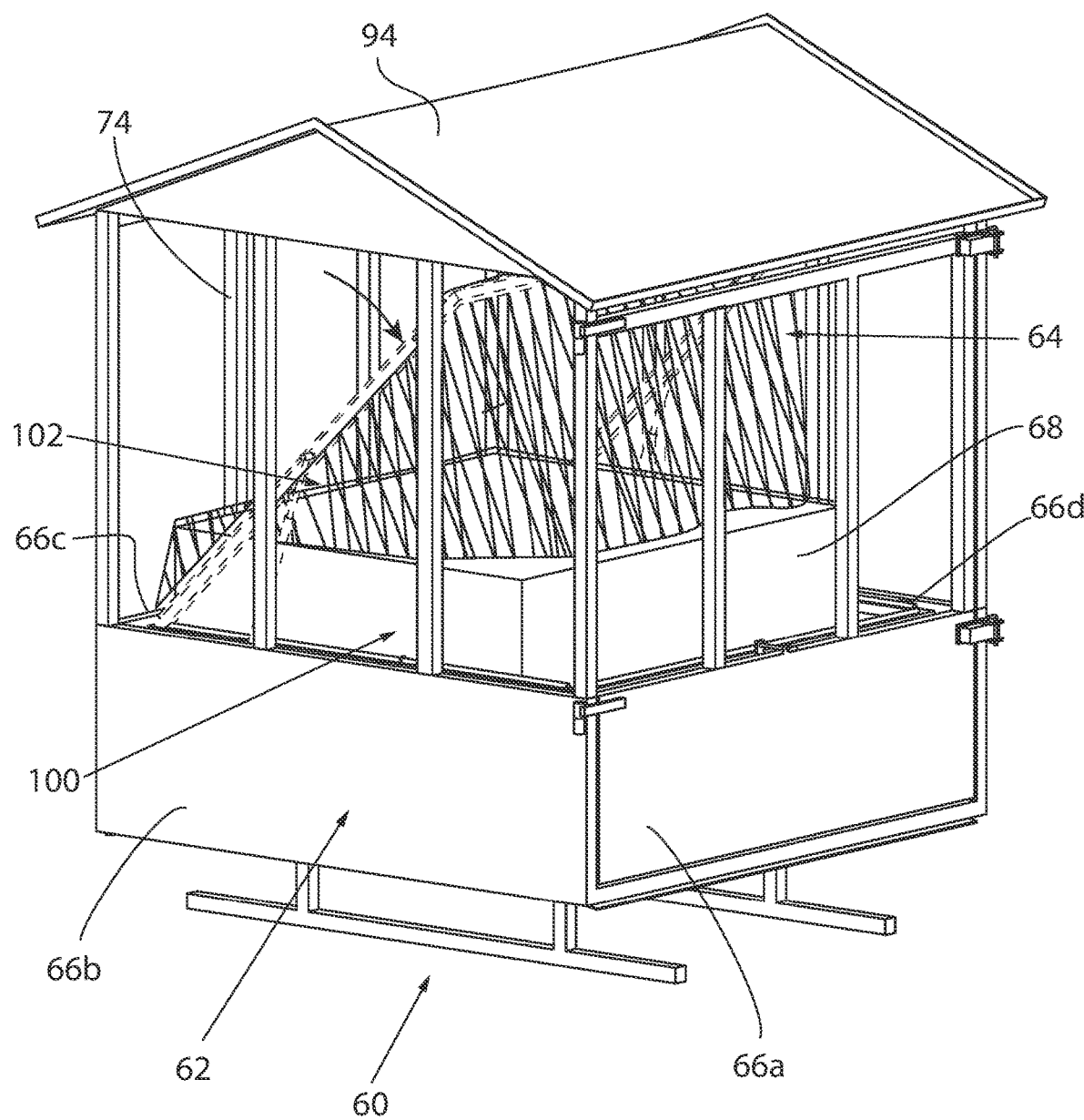
FIG. 7 illustrates an isometric perspective view of the inventive feeder of FIGS. 1-6 where the trolley system is moved downwardly to place a net system on top of the food.

The shock system 102 is configured to help manipulate and move the net system 100 relative to the food 68 to ensure the net system 100 surrounds the food product 68. More specifically, the shock system 102 includes hydraulics that allow the trolley system 64 to be moved between a lowered position in which the net system 100 may cover and surround the food product 68 as shown in FIGS. 8-10 and a raised position as shown in FIGS. 4-7 in which the net system 100 is spaced from the floor 76 in order to allow the food product 68 to be inserted into the frame 62. Once the food product 68 is appropriately located, the trolley system 64 can be lowered to the lowered position in order to surround the food product 68. The shock system 102 allows the manipulation of the net system 100 to quickly and easily be achieved, which otherwise can be very challenging due to the large size and weight of the food product 68.

Figure 11:
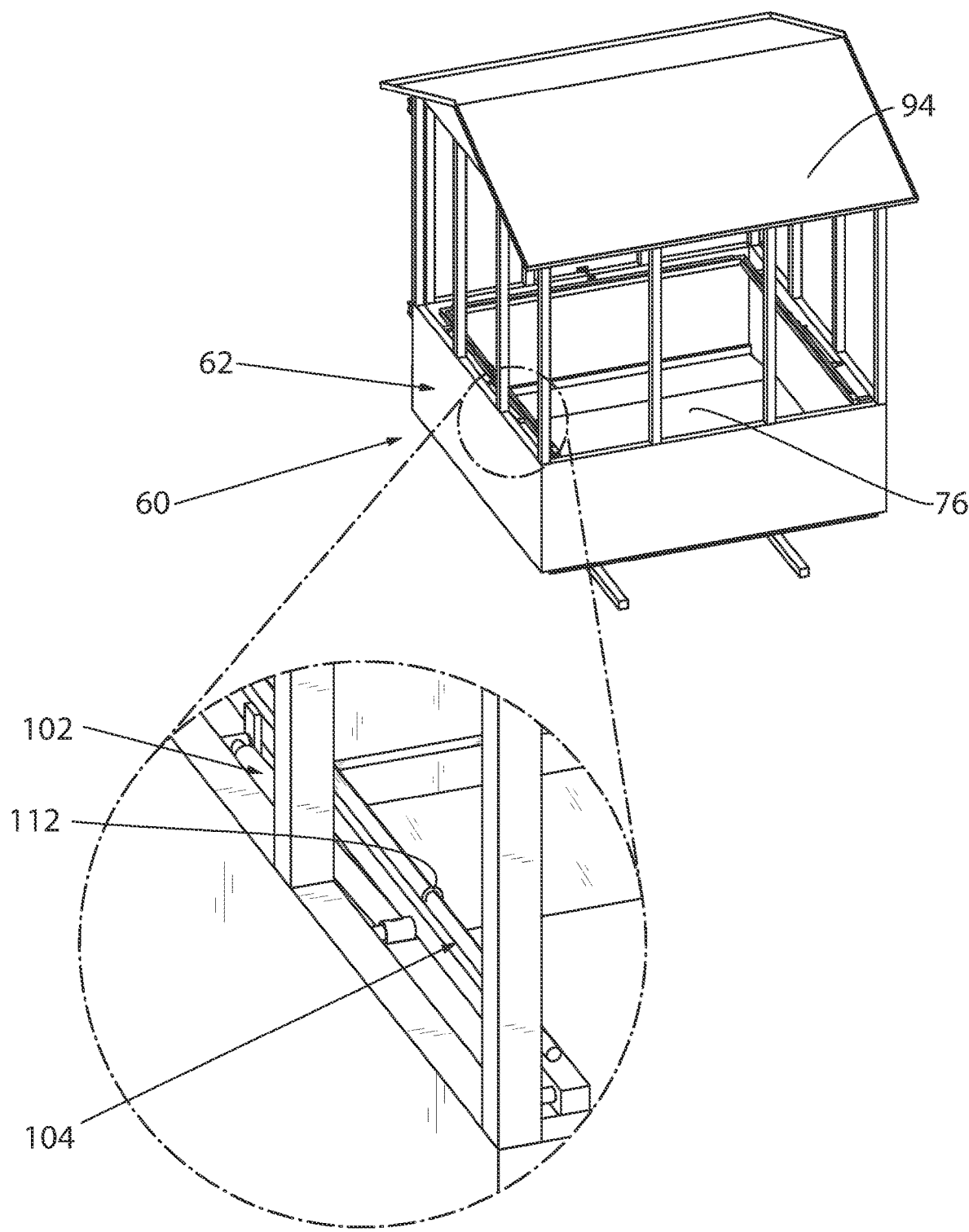
FIG. 11 illustrates an isometric perspective view of an inventive feeder system for animals and a detailed view of the frame and supporting components.
Figure 12:
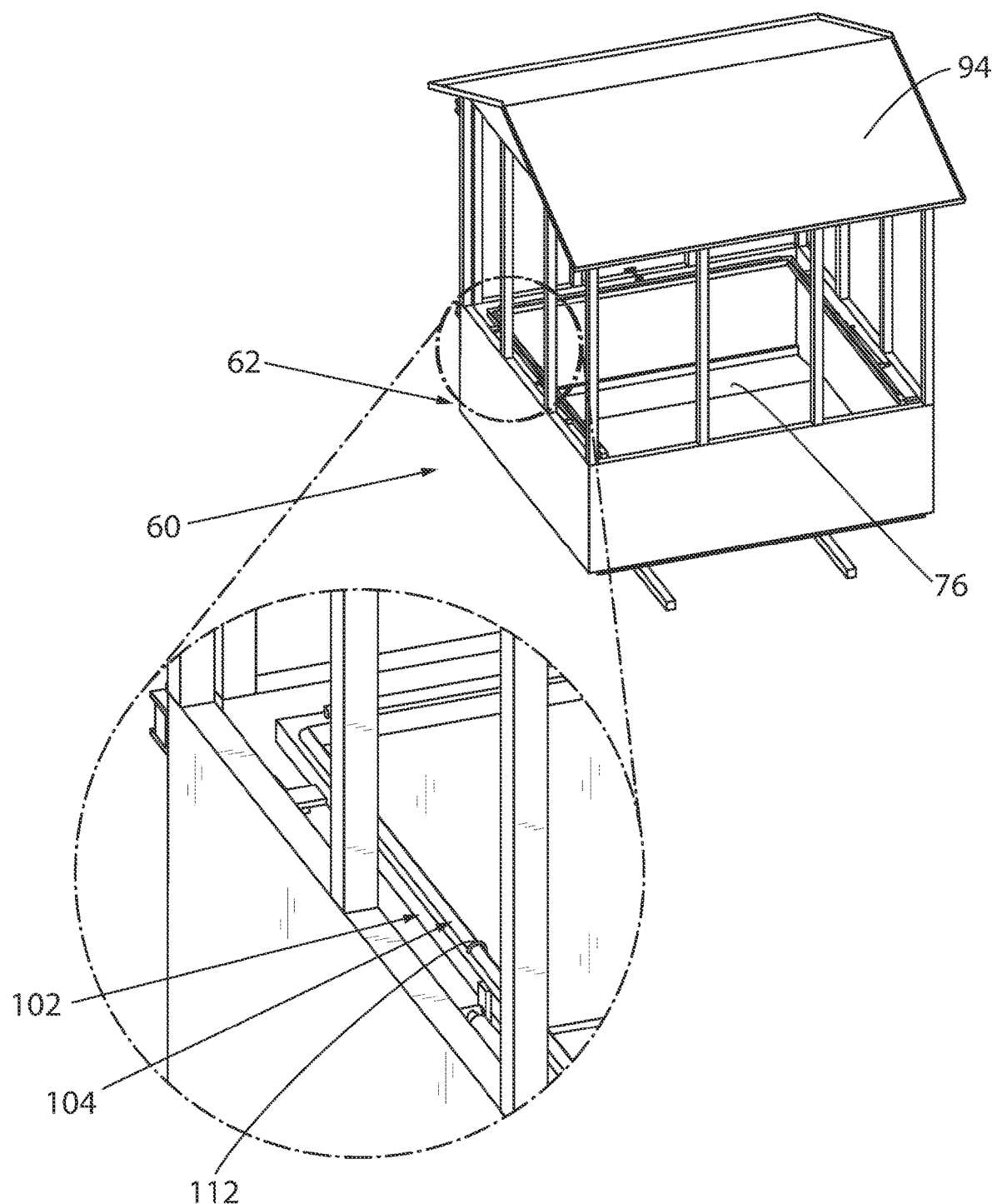
FIG. 12 illustrates an isometric perspective view of an inventive feeder system for animals and a detailed view of the frame and supporting components.
Figure 15:
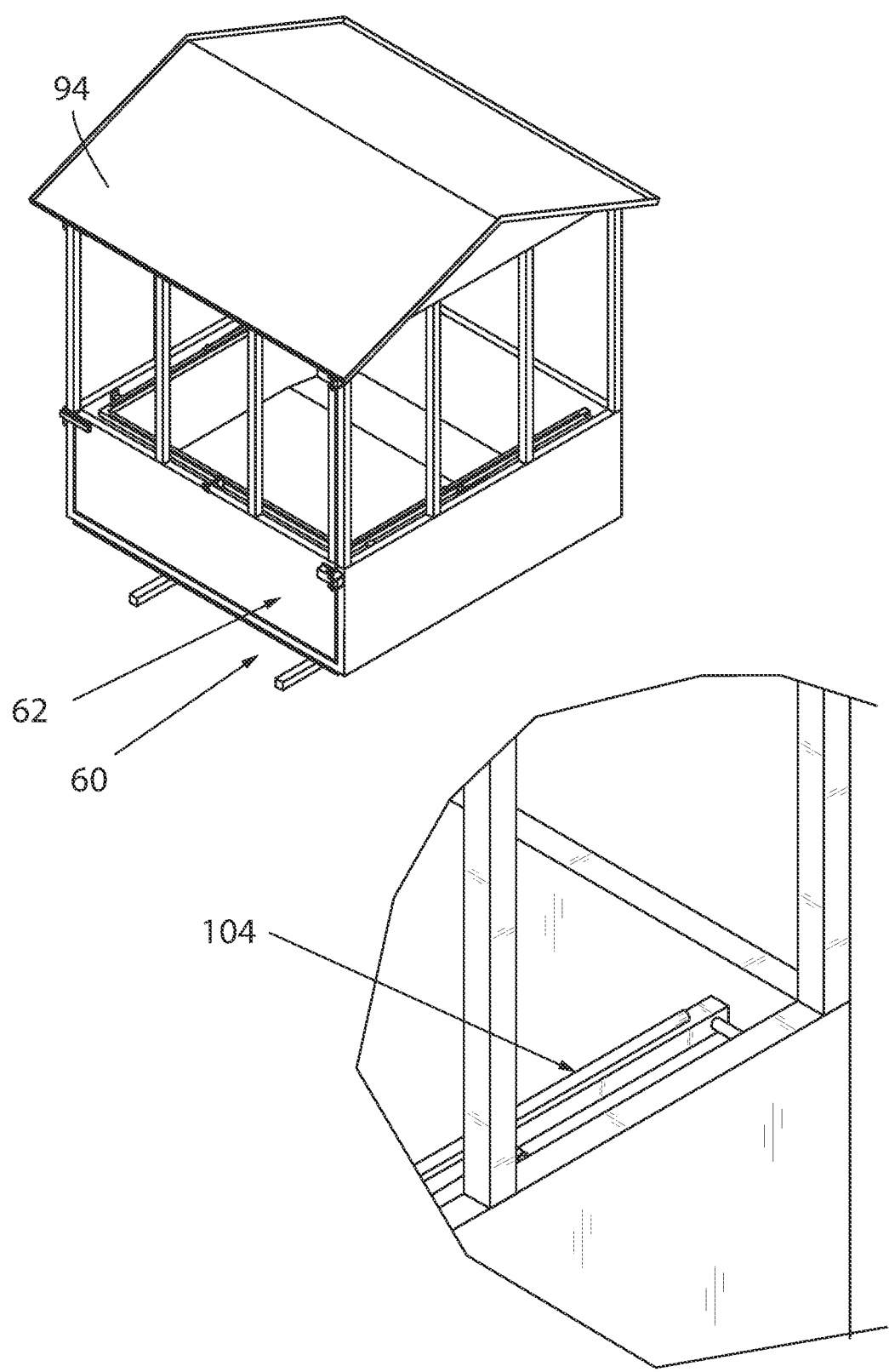
FIG. 15 illustrates an isometric bottom perspective view of an inventive feeder system for animals and a detailed view of the frame.
Figure 18:
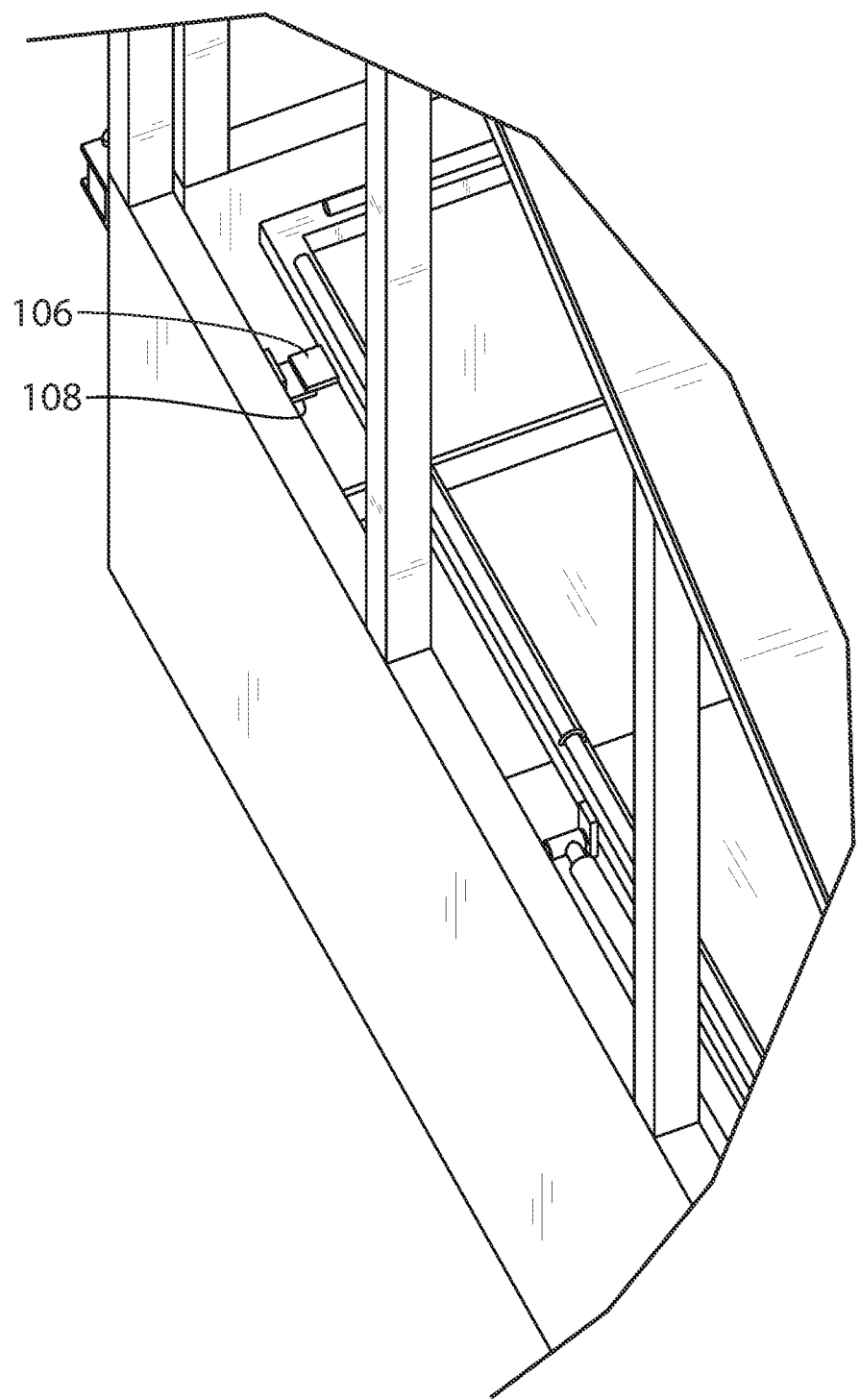
FIG. 18 illustrates an isometric top perspective view of the frame and a bump stop.

Further still, the feeder system 60 may include a rail system 104 that is used to secure the net system 100 in place as shown in FIGS. 11, 12, and 15. These figures are shown with the net system removed to better illustrate the rail system 104. More specifically, the rail system 104 may extend around the interior of the frame 62. The outer edges of the net system 100 may be threaded through the rail system 104. As such, the shock/suspension system 102 may move the rail system 104 in an upward and downward direction to move the net system 100 in an upward and downward direction. The rail system 104 may be of a rounded bar construction, such that there are minimal or no sharp edges that could cause injury to the animals. For instance, a half inch round bar may be used. Other potential bars may similarly be used, including a one-inch-by-one-inch square stock, although rounded bars are preferred. Also, the rail system 104 is preferably of a single-piece construction. The rail system 104 may also include bump stops, as shown in FIG. 26, which limit movement of the shock system 102 relative to the rail system 104. For instance, a first bump stop 106 may extend from the frame 62 and a second bump stop 108 may extend from the shock system 102 to prevent further movement of the shock system 102 relative to the frame 62 as shown in FIG. 18.

Additionally, the shock system 102 may be nested between the rail system 104 and the side walls 66 so that the shock system 102 is not exposed to prevent pinch points from occurring and to again minimize potential injury to the animal. Further still, fasteners used to connect the shock system 102 to the rail system 104 may be located specifically to minimize interaction with the animals. For instance, securing bolts and other fasteners (not shown) may be located beneath the rail system 104. Additionally, hooks 112 may be inserted into openings (not shown) formed around the rail system 104 that are used to secure the net system 100 in place relative to the rail system 104. More specifically, the hooks 112 are preferably oriented to minimize potential injuries to the animals.

Figure 19:
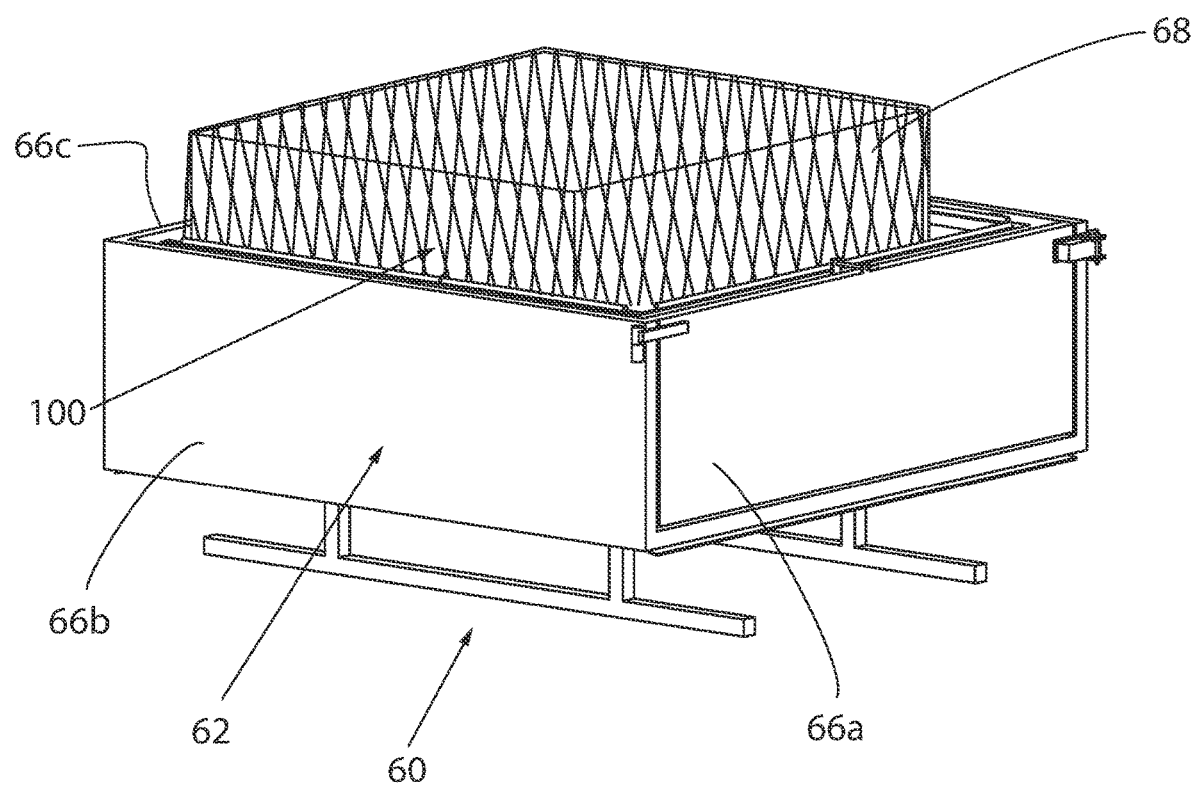
FIG. 19 illustrates an isometric perspective view of an inventive feeder that does not include a roof or uprights so it can be used with an existing structure.

Additionally, while the feeder system 60 may include some, but not necessarily all of the components described above. For instance, the feeder system may not include the uprights, the floor or base pan, or roof in certain embodiments. For instance, as shown in FIG. 19, the feeder system 60 may not include the uprights or the roof. The resulting feeder system 60 may be installed into an existing structure having existing sides and a roof. In such an embodiment, the feeder system 60 still provides the components needed to quickly and easily distribute the netting system about the food supply including the trolly system and shock system. Other components described herein may not be required for certain uses as desired by a user. These components may initially be installed about the feeder system 60 and subsequently removed for customization purposes, or the components may not be supplied with the feeder system 60 to keep costs down.

In terms of installation, the net system 100 is first fed along the rail system 104. Once in place, the hooks 112 can be secured. Because of the orientation of the rail system 104, the net system 100 can quickly be installed, for instance, in 10 or less minutes when multiple individuals are installing the net system 100, and in 20 or less minutes when a single individual is installing the net system 100. This is much faster than other feeder systems 60. Of course, installation could be even faster, or in some instances slower, depending on the experience of the user.

Figure 2:
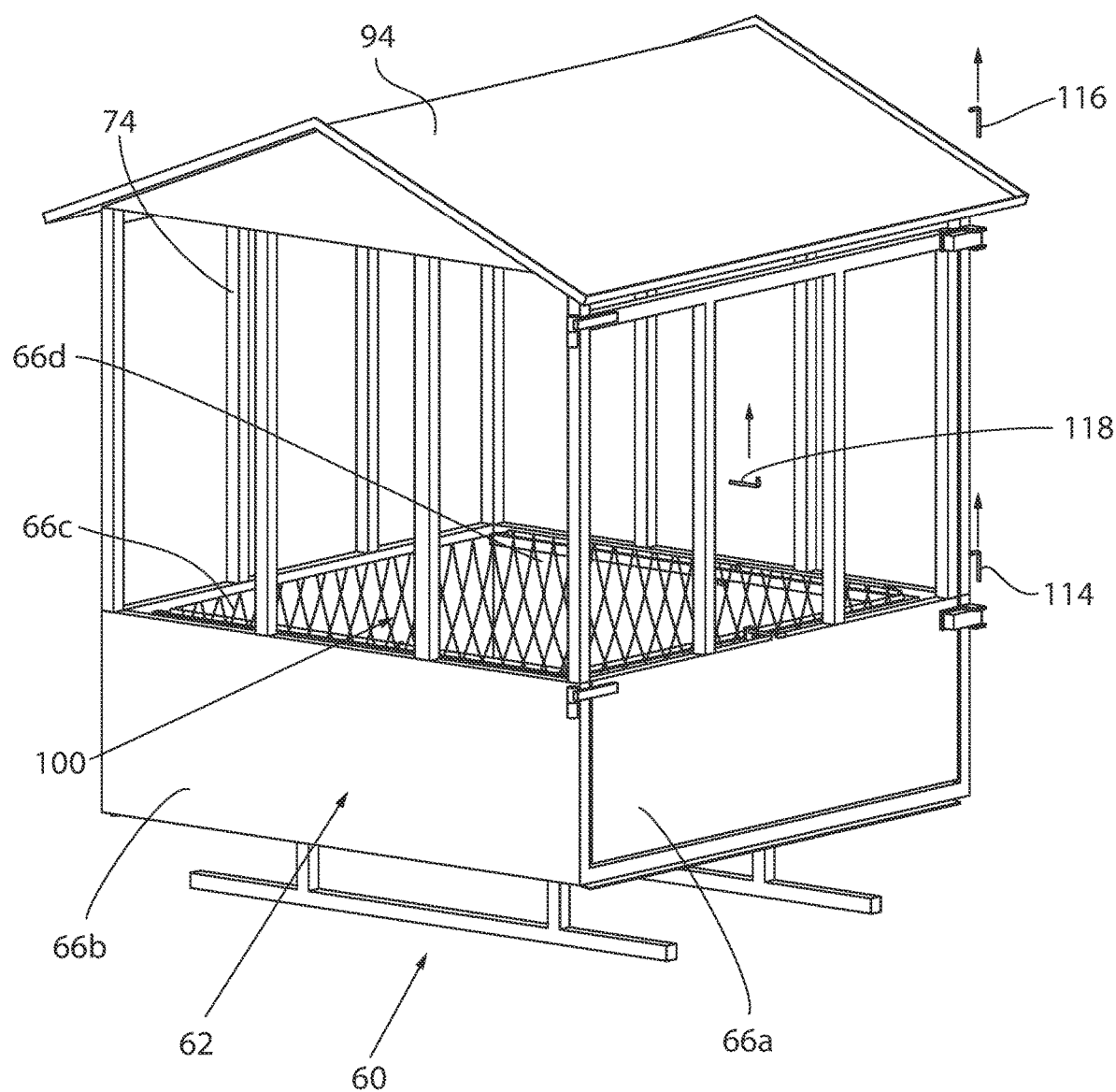
FIG. 2 illustrates an isometric perspective view of the inventive feeder of FIG. 1 where pins are removed from a first wall.

As previously mentioned, the various components may be releasably secured to one another. More specifically, in the illustrated embodiment, releasable fasteners are used, such as pins, although any other releasable fasteners could be used. The feeder system 60 may also have holes or openings 115 formed in surfaces of the frame for easy storage. These openings 115 help to prevent inadvertent misplacement of fasteners once the fasteners are removed in order to move the various components as described below and install the food product. For instance, a first releasable fastener 114, a second releasable fastener 116, and a third releasable fastener 118 may be used. For instance, the openings 115 are formed in the hinge 72 as shown in FIG. 14. Similarly, the openings could be formed directly adjacent to the locations in which the fasteners 114, 116, 118 described below. More specifically, the first releasable fastener 114 and the second releasable fastener 116 may be used to secure the first wall 66a to the fourth wall 66d thought pin locks. For instance, a first portion of the pin lock may be associated with the first wall 66a and a second portion of the pin lock may be associated with the fourth wall 66d, where the respective fastener may be inserted when the first and second portions are aligned. Of course, a single fastener could be used, and also more than two fasteners could be used. The first releasable fastener 114 and the second releasable fastener 116 may be vertically offset from one another, with the first 114 being located along the base 70, and the second 116 being located above the first 114, for instance, adjacent to the one of the plurality of spaced uprights 74. As seen in FIG. 2, these fasteners 114, 116 are pins that are removed, after which the first side wall 66a can be rotated away from the fourth side wall 66d. More specifically, the first side wall 66a can pivot about the second side wall 66b to open the interior of the frame. For instance, the first side wall 66a may be pivotable approximately 180 degrees relative to the second side wall 66b. Additionally, the frame may include a pin storage unit (not shown) where the pins can be stored after they are removed when the food is inserted into the system. Theses can be openings formed in the frame that help prevent displacing the fasteners inadvertently.

The third releasable fastener 118 may be used to secure the trolley system 64 in place relative to the first side wall 66a. Again, the third releasable fastener 118 may be a releasable pin, as can be seen in FIG. 2. Before the first side wall 66a is moved relative to the fourth side wall 66d, the third releasable fastener 118 may be removed. Once this occurs, the trolley system 64 can be moved upwardly and downwardly utilizing the shock system 102. Again, this allows the net system 100 to be easily manipulated and moved relative to the frame 62 to simplify the surrounding of the net system 100 around the food product 68. Once the food product 68 has successfully been inserted into the frame 62, the trolley system 64 can be returned to the lowered position, and the first side wall 66a can be rotated toward the fourth side wall 66d into the closed position. At this point, all three of the releasable fasteners 114, 116, 118 can be reinserted, with the first 114 and second 116 being reinserted to secure the first side wall 66a to the fourth side wall 66d, and the third releasable fastener 118 securing the trolley system 64 to the first side wall 66a.

Additionally, the present invention discloses a method of using the modular feeder 60 to quickly insert a quantity of food product 68 into the frame 62 of the feeder 60. The method may include removing the first fastener 114 that secures the first wall 66a to another wall, removing another fastener 118 from the first wall 66a to disengage the trolley system 64 from the first wall 66a as seen in FIG. 2. Thereafter, the first wall 66a may be pivoted relative to the other wall as seen in FIG. 3, and the trolley system 64 may be moved upwardly as seen in FIG. 4. Next, the quantity of food product 68 may be inserted into the frame 62 as seen in FIG. 5. After that, the first wall 66a may be closed, the trolley system 64 may be moved downwardly, and the releasable fasteners 114, 116, 118 may be replaced as seen in FIGS. 6-8. The method may also include the steps of draining a quantity of water from the roof 94 and draining a quantity of water from an interior of the frame 62 of the feeder system 60 through the opening formed adjacent to the floor 76. Further still, the method may include removably installing the roof 94 onto the sides 66, and removably installing a plurality of spaced uprights 74 onto the sides 66. Further still, the feeder system 60 may be moved from one location to another by engaging with cross bars 86, 92 extending along the floor 76.

Additionally, the feeder system 60 may be modular in construction to simplify shipping and delivery. More specifically, multiple floor/base pan 76 may be stacked upon one another for transportation purposes. Similarly, the optional plurality of spaced uprights 74 may be separately transported and then later installed. Further still, the optional roof 94 may be shipped separately and later releasably associated with the plurality of sides 66.

All the disclosed embodiments are useful in conjunction with feeding livestock animals, for instance, using bales of hay or other food products. There are virtually innumerable uses for the present invention, all of which need not be detailed here. All the disclosed embodiments can be practiced without undue experimentation.

Although the best mode contemplated by the inventors of carrying out the present invention is disclosed above, practice of the present invention is not limited thereto. It will be manifest that various additions, modifications, and rearrangements of the features of the present invention may be made without deviating from the spirit and scope of the underlying inventive concept.

Moreover, the individual components need not be formed in the disclosed shapes, or assembled in the disclosed configuration, but could be provided in virtually any shape and assembled in virtually any configuration. Further, while many of the components are shown as physically separate modules, it will be manifest that they may be integrated with one another. Furthermore, all the disclosed features of each disclosed embodiment can be combined with, or substituted for, the disclosed features of every other disclosed embodiment except where such features are mutually exclusive.

It is intended that the appended claims cover all such additions, modifications, and rearrangements. Expedient embodiments of the present invention are differentiated by the appended claims.

What is claimed is:

1. A feeder system for supplying food to at least one animal comprising:
   a frame comprising: at least one wall; and a floor;
   a trolley system comprised to enable expedited installation of a quantity of food within the frame comprising:
      a net system; and
   a shock system attached to the net system, the shock system configured to enable upward and downward movement of the net system; the trolley movable between: a lowered position where the net system is located adjacent to the floor; to a raised position where the shock system moves the net system upwardly and the quantity of food product is inserted into the frame; to the lowered position where the net system rests on top of the quantity of food product;
   wherein the at least one wall comprising: a first wall having a base; a second wall having a base; a third wall having a base and at least one releasable fastener configured to releasably fasten to the first wall; wherein the floor is a convexly shaped floor located within the first wall, the second wall, and the third wall; wherein the trolley system is releasably fastened to the third wall; wherein the net system is located within the first wall, the second wall, and the third wall; wherein the first wall, the second wall, and the third wall further comprises a plurality of spaced uprights;
   wherein the at least one releasable fastener of the third wall further comprises: a first releasable fastener located where the third wall meets the first wall at a top of the plurality of spaced uprights; a second releasable fastener located where the third wall meets the first wall at a bottom of the plurality of spaced uprights; and a third releasable fastener located substantially midway along the third wall at the bottom of the plurality of spaced uprights;

wherein the first releasable fastener and the second releasable fastener are removed to allow the third wall to pivot relative to the first wall up to 180 degrees;

wherein the third releasable fastener is configured to hold the trolley system in place relative to the frame; and wherein the third releasable fastener is removed to allow the trolley system to move from the lowered position to the raised position.

2. The feeder system of claim 1, wherein each of the spaced uprights extend upwardly at an angle of between 25-75 degrees relative to the base.

3. The feeder system of claim 1, wherein each of the spaced uprights extend upwardly substantially vertically relative to the base.

4. The feeder system of claim 2, wherein the frame further comprises: a fourth wall having a base;

a roof extending upwardly from the first wall, the second wall, the third wall, and the fourth wall;

wherein the roof is removably attachable to the first wall, the second wall, the third wall, and the fourth wall.

5. The feeder system of claim 4, further comprising at least one outlet formed in a corner of the roof;

wherein the roof is sloped toward the corner.

6. The feeder system of claim 4, wherein the first wall, the second wall, the third wall, and the fourth wall form one of: a seven-foot-by-seven-foot frame; a six-foot-by-six-foot frame; a five-foot-by-five-foot frame; a five-foot-by-ten-foot frame; and a four-foot-by-five-foot frame; and wherein the net system is selected from one of: a eleven-foot-by-eleven-foot net; a ten-foot-by-ten-foot net; a nine-foot-by-nine-foot net; a nine-foot-by-fourteen-foot net; and an eight-foot-by-nine-foot net.

7. The feeder system of claim 1, further comprising a rail system located within the frame configured to receive at least a portion of the net system;

wherein the shock system is located between the at least one of the walls and the rail system to prevent access by the at least one animal.

8. The feeder system of claim 7, further comprising a plurality of openings located adjacent to the rail system; and a plurality of hooks configured to wrap around the rail system to secure the net system in place.

9. The feeder system of claim 7, further comprising a plurality of screws and bolts securing the shock system to the frame, wherein the plurality of screws and bolts are mounted within the frame to prevent access by the at least one animal.

10. The feeder system of claim 1, further comprising at least one bump stop comprising:

a first bump stop component extending from the frame;

a second bump stop component extending from the shock system to prevent further movement of the shock system relative to the frame.

11. The feeder system of claim 1, further comprising at least one opening formed between at least one of the walls and the floor;

wherein the floor is sloped substantially evenly toward the opening.

12. The feeder system of claim 1, wherein the at least one wall is a continuous wall that extends in a substantially circular shape.

* * * * *